United States Patent
Sampey et al.

(10) Patent No.: US 12,131,331 B2
(45) Date of Patent: Oct. 29, 2024

(54) SYSTEMS AND METHODS FOR COLLABORATIVE GIFT CARD NETWORKS

(71) Applicant: SKUxchange, LLC, St. Petersburg, FL (US)

(72) Inventors: James Sampey, Indian Rocks Beach, FL (US); Bobby Tinsley, Palmetto, FL (US); Robert Zaccardo, St. Petersburg, FL (US); Kenneth Douglas, Bradenton, FL (US); Moshe Joshua, Woodmere, NY (US)

(73) Assignee: SkuXchange, Inc., St. Petersburg, FL (US)

( * ) Notice: Subject to any disclaimer, the term of this patent is extended or adjusted under 35 U.S.C. 154(b) by 0 days.

(21) Appl. No.: 16/784,018

(22) Filed: Feb. 6, 2020

(65) Prior Publication Data
US 2021/0004804 A1   Jan. 7, 2021

Related U.S. Application Data

(63) Continuation-in-part of application No. 16/503,994, filed on Jul. 5, 2019, and a continuation-in-part of application No. 16/503,999, filed on Jul. 5, 2019.

(51) Int. Cl.
*G06Q 20/40*   (2012.01)
*G06Q 20/20*   (2012.01)
(Continued)

(52) U.S. Cl.
CPC ......... *G06Q 20/409* (2013.01); *G06Q 20/202* (2013.01); *G06Q 20/203* (2013.01);
(Continued)

(58) Field of Classification Search
CPC .. G06Q 20/409; G06Q 20/202; G06Q 20/203; G06Q 20/204; G06Q 20/342;
(Continued)

(56) References Cited

U.S. PATENT DOCUMENTS

| | | | |
|---|---|---|---|
| 2013/0204690 A1* | 8/2013 | Liebmann | G06Q 30/0225 705/14.26 |
| 2014/0250002 A1* | 9/2014 | Isaacson | G06Q 30/0226 705/39 |

(Continued)

OTHER PUBLICATIONS

Rajendran et al., "Secure and Privacy Preserving Digital Payment" (published in 2017 IEEE SmartWorld, Ubiquitous Intelligence & Computing, Advanced & Trusted Computed, Scalable Computing & Communications, Cloud & Big Data Computing, Internet of People and Smart City Innovation, pp. 1-5 (Year: 2017).*

*Primary Examiner* — Resha Desai
*Assistant Examiner* — Patrick Kim
(74) *Attorney, Agent, or Firm* — Dax D. Anderson; Kirton McConkie

(57) ABSTRACT

Systems and methods for facilitating real-time item-specific application of a gift card balance to a purchase within a collaborative gift card network are described. Such methods permit restriction of gift cards and gift card balances to purchase of specific items. Collaborative systems are used to implement such methods, such as computer systems and networked computer system. Methods for facilitating item-specific application of a gift card balance may be performed using computer systems managed by a single entity as well as in distributed computing environments wherein aspects of the methods are implemented by disparate parties. Unique bank card number are associated with a promotional offer as well as item-specific information relating to authorized uses of the offer. When an offer is attempted to be redeemed, a secondary item-specific authorization check is performed in addition to a check of the validity of the overall promotional offer.

11 Claims, 5 Drawing Sheets

(51) Int. Cl.
*G06Q 20/34* (2012.01)
*G06Q 40/02* (2023.01)

(52) U.S. Cl.
CPC ......... *G06Q 20/204* (2013.01); *G06Q 20/342* (2013.01); *G06Q 40/02* (2013.01)

(58) Field of Classification Search
CPC .... G06Q 40/02; G06Q 20/045; G01Q 20/202; G01Q 20/203
See application file for complete search history.

(56) References Cited

U.S. PATENT DOCUMENTS

| | | | |
|---|---|---|---|
| 2018/0082295 A1* | 3/2018 | Boucard | G06Q 20/3672 |
| 2019/0087698 A1* | 3/2019 | Di Iorio | G06K 19/06037 |
| 2019/0130387 A1* | 5/2019 | Arora | G06Q 30/0207 |
| 2019/0295077 A1* | 9/2019 | Mardikar | G06Q 20/401 |

* cited by examiner

SYSTEMS AND METHODS FOR COLLABORATIVE GIFT CARD NETWORKS

CROSS-REFERENCE TO RELATED APPLICATIONS

This application is a continuation-in-part of prior application Ser. No. 16/503,994, filed Jul. 5, 2019 and prior application Ser. No. 16/503,999, filed Jul. 5, 2019, both of which are incorporated herein by reference for all they disclose.

BACKGROUND OF THE INVENTION

1. Field of the Invention

The present invention relates to the promotional offer industry, and more particularly to implementing collaborative gift card networks to increase functionality in the promotional offer industry.

2. Background and Related Art

In the promotional offer industry, including, without limitation, gift card programs, coupon programs, loyalty programs, and real-time payment programs, there are currently limits and difficulties imposed on participants in the promotional offer industry. For example, using traditional methods, a manufacturer that wishes to issue (e.g., typically through a vendor, marketing agent, etc.) coupons for its products has little or no control over coupon redemption and payment or effects of the couponing program until later (whether thirty days, sixty days, or six months later), when the manufacturer discovers how well the coupon program worked. Even the reward issuer (e.g., the vendor, marketing agent, etc.) typically has little or no control over coupon or offer redemption and payment and little knowledge of the course of redemption. At the same time, there is a significant risk of fraud in generation of fraudulent coupons, fraudulent reporting of redemption, and the like. Such problems are exacerbated by the convoluted redemption and settlement process. Accordingly, coupon issuers in the promotional offer industry, individually and jointly, traditionally have little knowledge or control over how their promotional coupons are used or if they are effective.

Similar problems are inherent in the gift card industry. Traditionally, there are few to no limits applicable to use of gift cards. A gift card issuer may wish to limit use of the gift cards toward purchase of certain items, but there is currently no way for gift card issuers to ensure that gift cards are used for any intended purpose. Instead, once a gift card is issued, the recipient is able to use the monetary value of the gift card for any desired purpose, and often (in the case of non-store-specific gift cards) through any desired retailer or location. The gift card value is applied to the total amount of the receipt, regardless of what product or products are purchased, and the gift card is not tied to any specific item or product purchased.

BRIEF SUMMARY OF THE INVENTION

Implementation of the invention provides systems and methods for facilitating real-time item-specific application of a gift card balance to a purchase within a collaborative gift card network. Implementation of the invention provides methods that permit restriction of gift cards and gift card balances to purchase of specific items, as well as systems for implementing such methods, such as computer systems and networked computer system, as well as non-transitory computer-readable media for causing computer systems to implement such methods. Implementation of the invention may be performed using computer systems managed by a single entity as well as in distributed computing environments wherein aspects of the methods are implemented by disparate parties.

According to implementations of the invention, a method is provided for facilitating real-time item-specific application of a gift card balance to a purchase within a collaborative gift card network. The method includes providing a network-connected server that includes one or more communications modules configured to establish one or more communicative connections with external computer systems over one or more computer networks, a long-term memory store, short-term memory, and a processor. The communications module, the long-term memory store, and the short term memory store are operatively connected with the processor to allow the processor to access the communications module, the long-term memory store, and the short-term memory thereby providing the processor with access to data therefrom and transfer of data thereto. The method also includes storing, in the long-term memory store, information relating to one or more items for which use of a gift card is authorized, generating a list of gift card numbers and associated gift card amounts, and storing the gift card numbers and associated gift card amounts in the long-term memory store with an association between each gift card number and its associated gift card amount and information identifying one or more items for which use of the gift card number and its associated gift card amount is authorized. The method further includes steps of establishing a bank card processor communicative connection with a bank card processor computer system, establishing a retailer communicative connection with a retailer computer system, receiving, over the bank card processor communicative connection, an electronic communication comprising a gift card number and information identifying a retailer where the gift card number was provided as at least partial payment for a purchase, and automatically transmitting, over the retailer communicative connection to the retailer computer system, information authorizing the retailer where the gift card number was provided as at least partial payment to apply the gift card amount to the purchase only when the purchase includes the one or more items for which use of the gift card number and its associated gift card amount is authorized.

In some implementations, the method also includes receiving, over the retailer communicative connection from the retailer computer system, an electronic communication including information identifying one or more items included in the purchase. In some implementations, the method includes associating the electronic communication received over the bank card processor communicative connection with the electronic communication received over the retailer communicative connection, retrieving, from the long-term memory store information the information identifying one or more items for which use of the gift card number and its associated gift card amount is authorized, using the processor to identify a match between the information identifying one or more items for which use of the gift card number and its associated gift card amount is authorized and the information identifying one or more items included in the purchase, and generating the information authorizing the retailer to apply the gift card amount to the purchase.

In some implementations, the information identifying one or more items included in the purchase includes information such as a stock keeping unit (SKU), a global trade item number (GTIN), a universal product code (UPC), an international article number (ARN), or an Australian product number (APN). In some implementations, the method further includes transmitting, over the retailer communicative connection, a request to the retailer computer system to provide the information identifying the one or more items included in the purchase. In some implementations, the server selects the retailer computer system based on the information identifying a retailer received over the bank card processor communicative connection.

In some implementations, the method includes using the gift card number and the information identifying a retailer received over the bank card processor communicative connection to retrieve the association between the gift card number and the information identifying one or more items for which use of the gift card number and its associated gift card amount is authorized, and generating the information authorizing the retailer where the gift card number was provided as at least partial payment to apply the gift card amount to the purchase only if the purchase includes one or more items matching the one or more items for which use of the gift card number and its associated gift card amount is authorized. In some implementations, the information authorizing the retailer where the gift card number was provided as at least partial payment to apply the gift card amount to the purchase includes information associated with each item for which use of the gift card number and its associated gift card amount is authorized such as a SKU, a GTIN, a UPC, an ARN, or an APN.

In some implementations, the information identifying a retailer where the gift card number was provided as at least partial payment includes information identifying a point-of-sale (POS) system at which the gift card number was provided. In some implementations, the information identifying a retailer where the gift card number was provided as at least partial payment includes global positioning system (GPS) or other retailer location information.

According to further implementations of the invention, a method for facilitating item-specific application of a gift card balance to a purchase within a collaborative gift card network is provided. The method includes providing a POS system including a processor, an item-entry system adapted to receive information identifying purchased items as parts of sales, a storage system comprising a computer memory operatively coupled to the item-entry system and configured to store the information identifying purchased items, a payment-receipt system adapted to receive information associated with a gift card payment for sales, a payment-redemption communicative connection adapted to be in at least intermittent communicative connection with a payment-authorization network, and a product-verification communicative connection adapted to be in at least intermittent communicative connection with a product-verification network. The method further includes receiving information at the POS system through the item-entry system identifying one or more purchased items as part of a sale, storing the information identifying one or more purchased items in the computer memory, and receiving information at the POS system through the payment-receipt system identifying a uniquely numbered gift card used as at least partial payment for the one or more purchased items. The method also includes transmitting the information identifying the gift card using the payment redemption communicative connection to a payment authorizer, receiving from the payment authorizer over the payment redemption communicative connection an authorization of the gift card for a gift card amount, and receiving over the product verification communicative connection an electronic communication containing information identifying one or more products for which application of at least a portion of the gift card amount is authorized. The method also includes steps of electronically comparing the information identifying the one or more products for which application of at least a portion of the gift card amount is authorized to the information stored in the computer memory identifying the one or more purchased items, and automatically applying at least a portion of the gift card amount to the sale only if the information identifying the one or more products for which application of at least a portion of the gift card amount matches at least some of the information identifying the one or more purchased items.

In some implementations, the method also includes sending, over the product-verification communicative connection, an electronic communication including the information identifying the gift card. In some implementations, the information identifying the gift card includes a unique gift card number. In some implementations, the information identifying one or more purchased items includes information such as a SKU, a GTIN, a UPC, an ARN, or an APN. In some implementations, the information identifying the one or more products for which application of at least a portion of the gift card amount is authorized comprises information such as a SKU, a GTIN, a UPC, an ARN, or an APN.

According to other implementations of the invention, a method for facilitating item-specific application of a gift card balance to a purchase within a collaborative gift card network, is provided. The method includes providing a POS system including a processor, an item-entry system adapted to receive information identifying purchased items as parts of sales, a storage system comprising a computer memory operatively coupled to the item-entry system and configured to store the information identifying purchased items, a payment-receipt system adapted to receive information associated with a gift card payment for sales, a payment-redemption communicative connection adapted to be in at least intermittent communicative connection with a payment-authorization network, and a product-verification communicative connection adapted to be in at least intermittent communicative connection with a product-verification network. The method also includes steps of receiving information at the POS system through the item-entry system identifying one or more purchased items as part of a sale, storing the information identifying one or more purchased items in the computer memory, and receiving information at the POS system through the payment-receipt system identifying a uniquely numbered gift card used as at least partial payment for the one or more purchased items. The method also includes transmitting the information identifying the gift card using the payment-redemption communicative connection to a payment authorizer and receiving from the payment authorizer over the payment redemption communicative connection an authorization of the gift card for a gift card amount. The method also includes transmitting over the product-verification communicative connection an electronic communication containing information identifying the one or more purchased items, receiving over the product-verification communicative connection a confirmation that the one or more purchased items comprises an item authorized for use of the gift card amount, and automatically applying at least a portion of the gift card amount to the sale only if the confirmation that the one or more purchased items comprises an item authorized for use of the gift card amount.

In some implementations, the method further includes sending, over the product-verification communicative connection, an electronic communication including the information identifying the gift card. In some implementations, the information identifying the gift card includes a unique gift card number. In some implementations, the information identifying one or more purchased items includes information such as a SKU, a GTIN, a UPC, an ARN, or an APN. In some implementations, the information identifying the one or more products for which application of at least a portion of the gift card amount is authorized includes information such as a SKU, a GTIN, a UPC, an ARN, or an APN. In some implementations, the method also includes transmitting information identifying the POS system using the payment-redemption communicative connection.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

Figure 1:
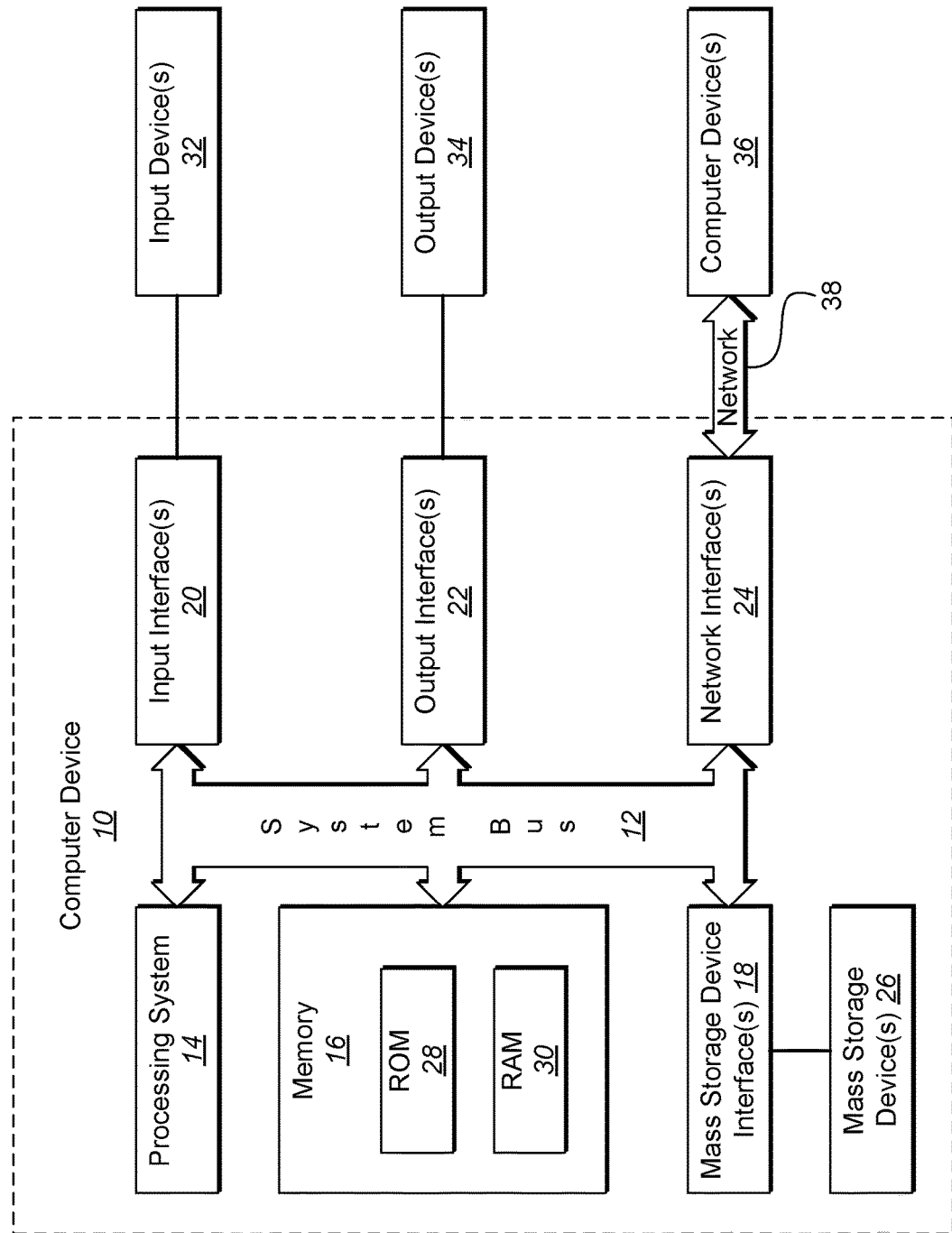
FIG. 1 shows a representative computer system for use with embodiments of the invention.

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Embodiments of the invention provide systems and methods for facilitating real-time item-specific application of a gift card balance to a purchase within a collaborative gift card network. Embodiments of the invention provide methods that permit restriction of gift cards and gift card balances to purchase of specific items, as well as systems for implementing such methods, such as computer systems and networked computer system, as well as non-transitory computer-readable media for causing computer systems to implement such methods. Embodiments of the invention may be performed using computer systems managed by a single entity as well as in distributed computing environments wherein aspects of the methods are implemented by disparate parties.

According to embodiments of the invention, a method is provided for facilitating real-time item-specific application of a gift card balance to a purchase within a collaborative gift card network. The method includes providing a network-connected server that includes one or more communications modules configured to establish one or more communicative connections with external computer systems over one or more computer networks, a long-term memory store, short-term memory, and a processor. The communications module, the long-term memory store, and the short term memory store are operatively connected with the processor to allow the processor to access the communications module, the long-term memory store, and the short-term memory thereby providing the processor with access to data therefrom and transfer of data thereto. The method also includes storing, in the long-term memory store, information relating to one or more items for which use of a gift card is authorized, generating a list of gift card numbers and associated gift card amounts, and storing the gift card numbers and associated gift card amounts in the long-term memory store with an association between each gift card number and its associated gift card amount and information identifying one or more items for which use of the gift card number and its associated gift card amount is authorized. The method further includes steps of establishing a bank card processor communicative connection with a bank card processor computer system, establishing a retailer communicative connection with a retailer computer system, receiving, over the bank card processor communicative connection, an electronic communication comprising a gift card number and information identifying a retailer where the gift card number was provided as at least partial payment for a purchase, and automatically transmitting, over the retailer communicative connection to the retailer computer system, information authorizing the retailer where the gift card number was provided as at least partial payment to apply the gift card amount to the purchase only when the purchase includes the one or more items for which use of the gift card number and its associated gift card amount is authorized.

In some embodiments, the method also includes receiving, over the retailer communicative connection from the retailer computer system, an electronic communication including information identifying one or more items included in the purchase. In some embodiments, the method includes associating the electronic communication received over the bank card processor communicative connection with the electronic communication received over the retailer communicative connection, retrieving, from the long-term memory store information the information identifying one or more items for which use of the gift card number and its associated gift card amount is authorized, using the processor to identify a match between the information identifying one or more items for which use of the gift card number and its associated gift card amount is authorized and the information identifying one or more items included in the purchase, and generating the information authorizing the retailer to apply the gift card amount to the purchase.

In some embodiments, the information identifying one or more items included in the purchase includes information such as a stock keeping unit (SKU), a global trade item number (GTIN), a universal product code (UPC), an international article number (ARN), or an Australian product number (APN). In some embodiments, the method further includes transmitting, over the retailer communicative connection, a request to the retailer computer system to provide the information identifying the one or more items included in the purchase. In some embodiments, the server selects the retailer computer system based on the information identifying a retailer received over the bank card processor communicative connection.

In some embodiments, the method includes using the gift card number and the information identifying a retailer received over the bank card processor communicative connection to retrieve the association between the gift card number and the information identifying one or more items for which use of the gift card number and its associated gift card amount is authorized, and generating the information authorizing the retailer where the gift card number was provided as at least partial payment to apply the gift card amount to the purchase only if the purchase includes one or more items matching the one or more items for which use of the gift card number and its associated gift card amount is authorized. In some embodiments, the information authorizing the retailer where the gift card number was provided as at least partial payment to apply the gift card amount to the purchase includes information associated with each item for which use of the gift card number and its associated gift card amount is authorized such as a SKU, a GTIN, a UPC, an ARN, or an APN.

In some embodiments, the information identifying a retailer where the gift card number was provided as at least partial payment includes information identifying a point-of-sale (POS) system at which the gift card number was provided. In some embodiments, the information identifying a retailer where the gift card number was provided as at least partial payment includes global positioning system (GPS) or other retailer location information.

According to further embodiments of the invention, a method for facilitating item-specific application of a gift card balance to a purchase within a collaborative gift card network is provided. The method includes providing a POS system including a processor, an item-entry system adapted to receive information identifying purchased items as parts of sales, a storage system comprising a computer memory operatively coupled to the item-entry system and configured to store the information identifying purchased items, a payment-receipt system adapted to receive information associated with a gift card payment for sales, a payment-redemption communicative connection adapted to be in at least intermittent communicative connection with a payment-authorization network, and a product-verification communicative connection adapted to be in at least intermittent communicative connection with a product-verification network. The method further includes receiving information at the POS system through the item-entry system identifying one or more purchased items as part of a sale, storing the information identifying one or more purchased items in the computer memory, and receiving information at the POS system through the payment-receipt system identifying a uniquely numbered gift card used as at least partial payment for the one or more purchased items. The method also includes transmitting the information identifying the gift card using the payment redemption communicative connection to a payment authorizer, receiving from the payment authorizer over the payment redemption communicative connection an authorization of the gift card for a gift card amount, and receiving over the product verification communicative connection an electronic communication containing information identifying one or more products for which application of at least a portion of the gift card amount is authorized. The method also includes steps of electronically comparing the information identifying the one or more products for which application of at least a portion of the gift card amount is authorized to the information stored in the computer memory identifying the one or more purchased items, and automatically applying at least a portion of the gift card amount to the sale only if the information identifying the one or more products for which application of at least a portion of the gift card amount matches at least some of the information identifying the one or more purchased items.

In some embodiments, the method also includes sending, over the product-verification communicative connection, an electronic communication including the information identifying the gift card. In some embodiments, the information identifying the gift card includes a unique gift card number. In some embodiments, the information identifying one or more purchased items includes information such as a SKU, a GTIN, a UPC, an ARN, or an APN. In some embodiments, the information identifying the one or more products for which application of at least a portion of the gift card amount is authorized comprises information such as a SKU, a GTIN, a UPC, an ARN, or an APN.

According to other embodiments of the invention, a method for facilitating item-specific application of a gift card balance to a purchase within a collaborative gift card network, is provided. The method includes providing a POS system including a processor, an item-entry system adapted to receive information identifying purchased items as parts of sales, a storage system comprising a computer memory operatively coupled to the item-entry system and configured to store the information identifying purchased items, a payment-receipt system adapted to receive information associated with a gift card payment for sales, a payment-redemption communicative connection adapted to be in at least intermittent communicative connection with a payment-authorization network, and a product-verification communicative connection adapted to be in at least intermittent communicative connection with a product-verification network. The method also includes steps of receiving information at the POS system through the item-entry system identifying one or more purchased items as part of a sale, storing the information identifying one or more purchased items in the computer memory, and receiving information at the POS system through the payment-receipt system identifying a uniquely numbered gift card used as at least partial payment for the one or more purchased items. The method also includes transmitting the information identifying the gift card using the payment-redemption communicative connection to a payment authorizer and receiving from the payment authorizer over the payment redemption communicative connection an authorization of the gift card for a gift card amount. The method also includes transmitting over the product-verification communicative connection an electronic communication containing information identifying the one or more purchased items, receiving over the product-verification communicative connection a confirmation that the one or more purchased items comprises an item authorized for use of the gift card amount, and automatically applying at least a portion of the gift card amount to the sale only if the confirmation that the one or more purchased items comprises an item authorized for use of the gift card amount.

In some embodiments, the method further includes sending, over the product-verification communicative connection, an electronic communication including the information identifying the gift card. In some embodiments, the information identifying the gift card includes a unique gift card number. In some embodiments, the information identifying one or more purchased items includes information such as a SKU, a GTIN, a UPC, an ARN, or an APN. In some embodiments, the information identifying the one or more products for which application of at least a portion of the gift card amount is authorized includes information such as a SKU, a GTIN, a UPC, an ARN, or an APN. In some embodiments, the method also includes transmitting information identifying the POS system using the payment-redemption communicative connection.

FIG. 1 and the corresponding discussion are intended to provide a general description of a suitable operating environment in which embodiments of the invention may be implemented. One skilled in the art will appreciate that embodiments of the invention may be practiced by one or more computing devices and in a variety of system configurations, including in a networked configuration. However, while the methods and processes of the present invention have proven to be particularly useful in association with a system comprising a general purpose computer, embodiments of the present invention include utilization of the methods and processes in a variety of environments, including embedded systems with general purpose processing units, digital/media signal processors (DSP/MSP), application specific integrated circuits (ASIC), stand alone electronic devices, and other such electronic environments.

Embodiments of the present invention embrace one or more computer-readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer-readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), digital versatile disc ("DVD") media, Blu-Ray media, or any other device or component that is capable of providing data or executable instructions that may be accessed by a processing system. While embodiments of the invention embrace the use of all types of computer-readable media, certain embodiments as recited in the claims may be limited to the use of tangible, non-transitory computer-readable media, and the phrases "tangible computer-readable medium" and "non-transitory computer-readable medium" (or plural variations) used herein are intended to exclude transitory propagating signals per se.

With reference to FIG. 1, a representative system for implementing embodiments of the invention includes computer device 10, which may be a general-purpose or special-purpose computer or any of a variety of consumer electronic devices. For example, computer device 10 may be a personal computer, a notebook or laptop computer, a netbook, a personal digital assistant ("PDA") or other hand-held device, a smart phone, a tablet computer, a workstation, a minicomputer, a mainframe, a supercomputer, a multi-processor system, a network computer, a processor-based consumer electronic device, a computer device integrated into another device or vehicle, or the like. In some embodiments, computer device 10 is or forms part of a point-of-sale (POS) system such as a register, a sales tablet, a sales mobile device such as a smart phone, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer-readable media, such as on memory 16, a solid state drive, a removable solid state drive, a magnetic hard disk, a removable magnetic disk, a magnetic cassette, an optical disk, or from a communication connection, which may also be viewed as a computer-readable medium.

Memory 16 includes one or more computer-readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include solid state drives, hard disk drives, magnetic disk drives, tape drives and optical disk drives. A mass storage device 26 may read from and/or write to solid state memory, a magnetic hard disk, a removable magnetic disk, a magnetic cassette, an optical disk, or another computer-readable medium. Mass storage devices 26 and their corresponding computer-readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. When computer device is or is part of a POS system, additional input interface examples include SKU scanning devices, near-field-communication ("NFC") contactless payment card readers, EMV-standard card readers, magnetic card readers, keypads, NFC product scanners, associated touch screens, and the like. Similarly, examples of input interfaces 20 that may be used to connect the input devices 32 to the system bus 12 include a serial port, a parallel port, a game port, a universal serial bus ("USB"), an integrated circuit, a firewire (IEEE 1394), or another interface. For example, in some embodiments input interface 20 includes an application specific integrated circuit (ASIC) that is designed for a particular application. In a further embodiment, the ASIC is embedded and connects existing circuit building blocks. In some embodiments, one or more input interfaces 20 may be provided by an external device connected to a port of the system (e.g., as a peripheral device).

One or more output interfaces 22 may be employed to connect one or more corresponding output devices 34 to system bus 12. Examples of output devices include a monitor or display screen, a speaker, a printer, a multi-functional peripheral, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 2:
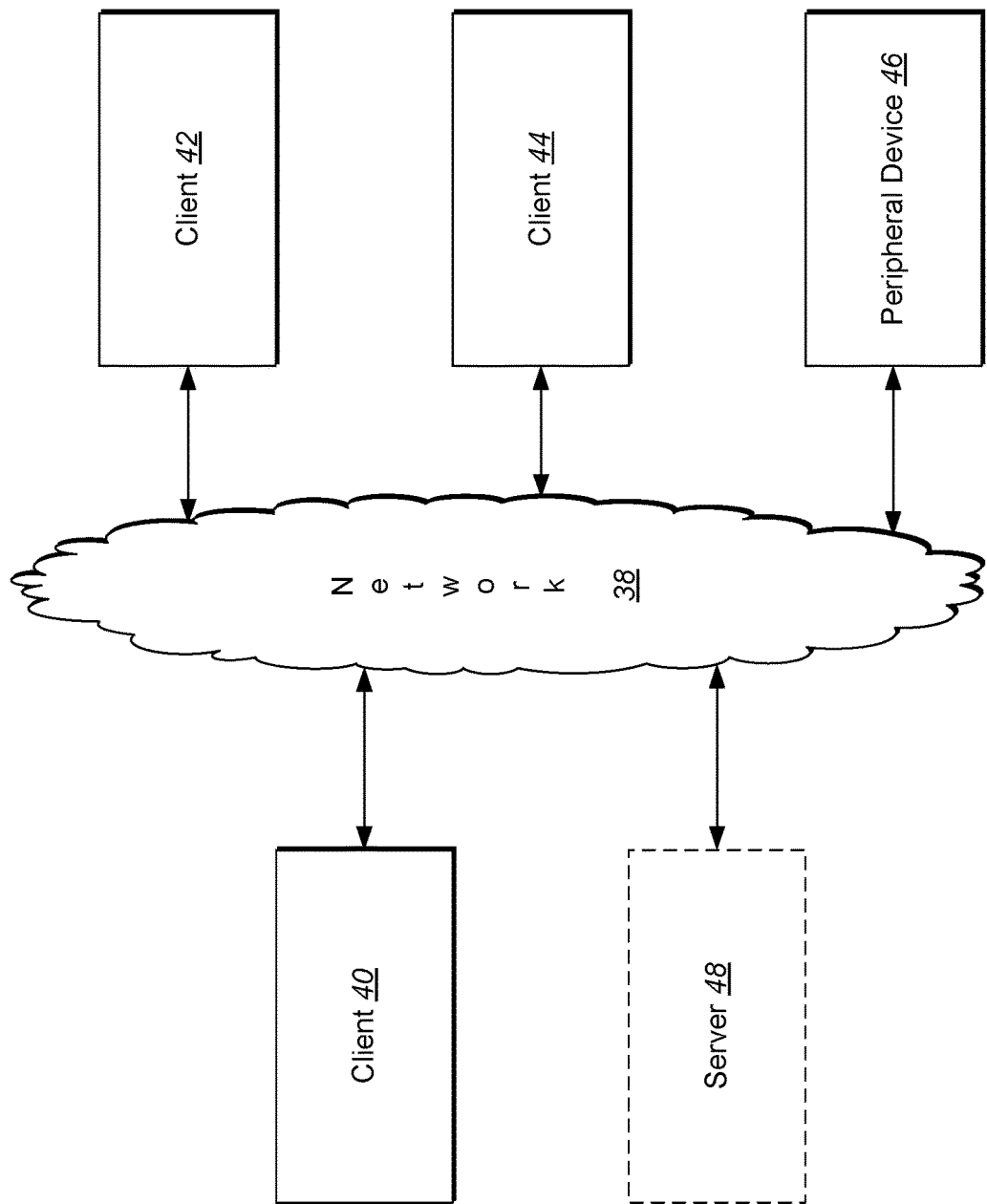
FIG. 2 shows a representative networked computer system for use with embodiments of the invention.

Thus, while those skilled in the art will appreciate that embodiments of the present invention may be practiced in a variety of different environments with many types of system configurations, FIG. 2 provides a representative networked system configuration that may be used in association with embodiments of the present invention. The representative system of FIG. 2 includes a computer device, illustrated as client 40, which is connected to one or more other computer devices (illustrated as client 42 and client 44) and one or more peripheral devices 46 across network 38. While FIG. 2 illustrates an embodiment that includes a client 40, two additional clients, client 42 and client 44, one peripheral device 46, and optionally a server 48, connected to network 38, alternative embodiments include more or fewer clients, more than one peripheral device, no peripheral devices, no server 48, and/or more than one server 48 connected to network 38. Other embodiments of the present invention include local, networked, or peer-to-peer environments where one or more computer devices may be connected to one or more local or remote peripheral devices. Moreover, embodiments in accordance with the present invention also embrace a single electronic consumer device, wireless networked environments, and/or wide area networked environments, such as the Internet.

Similarly, embodiments of the invention embrace cloud-based architectures where one or more computer functions are performed by remote computer systems and devices at the request of a local computer device. Thus, returning to FIG. 2, the client 40 may be a computer device having a limited set of hardware and/or software resources. Because the client 40 is connected to the network 38, it may be able to access hardware and/or software resources provided across the network 38 by other computer devices and resources, such as client 42, client 44, server 48, or any other resources. The client 40 may access these resources through an access program, such as a web browser, and the results of any computer functions or resources may be delivered through the access program to the user of the client 40. In such configurations, the client 40 may be any type of computer device or electronic device discussed above or known to the world of cloud computing, including traditional desktop and laptop computers, smart phones and other smart devices, tablet computers, or any other device able to provide access to remote computing resources through an access program such as a browser.

Figure 3:
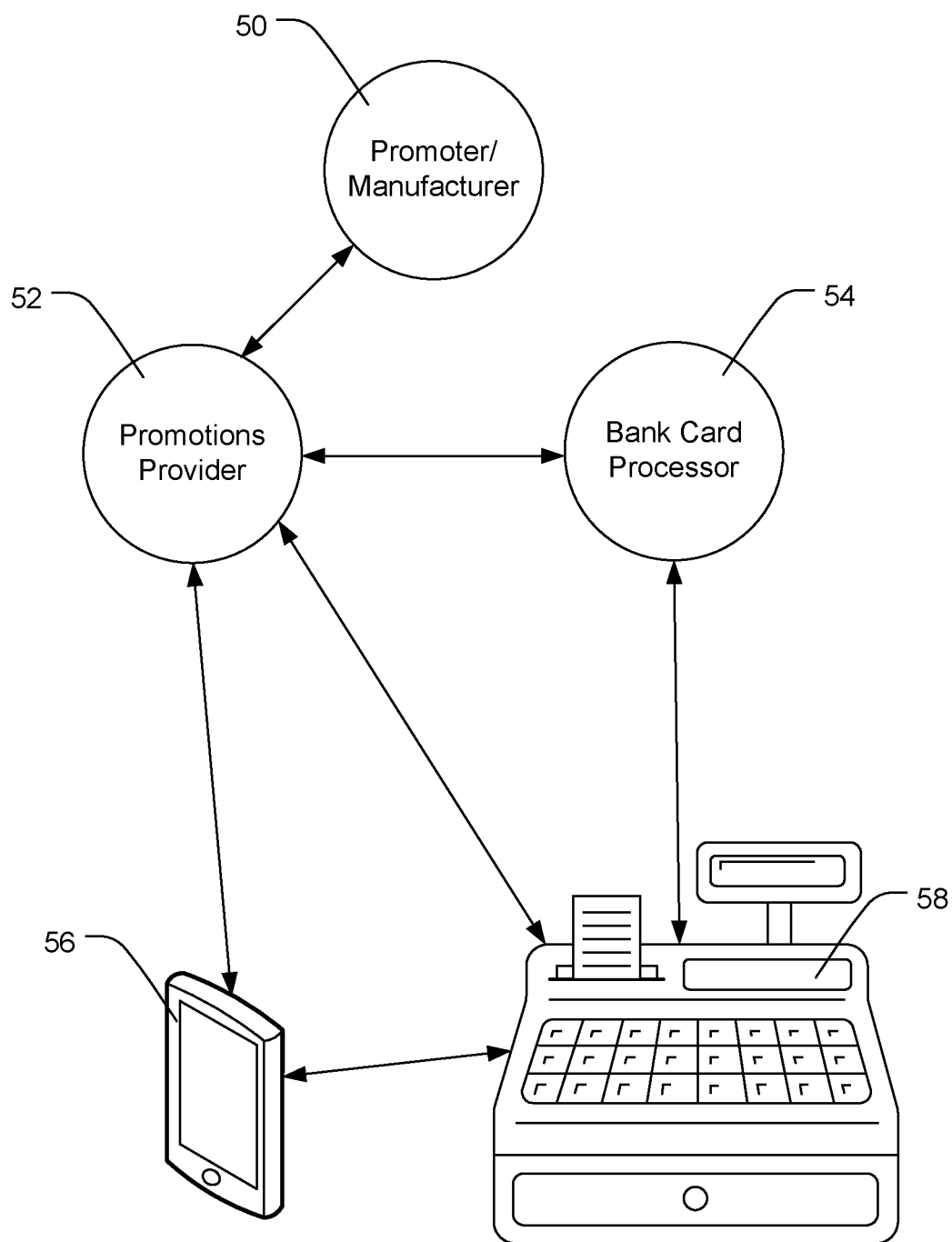
FIG. 3 shows one example of a representative environment in which embodiments of the invention may be implemented.

FIG. 3 illustrates one representative environment in which embodiments of the invention for facilitating item-specific application of gift card balances may be implemented. The promotion environment includes a promoter 50, which in some instances is a manufacturer of products or a provider of services, or in other instances is an entity or organization operating on behalf of a manufacturer or other provider. In some circumstances, the promoter 50 may be a retail store or chain electing to offer discounts on the products it carries or services it sells. In other circumstances, the promoter 50 is a third party tasked with representing a retail store or chain. Accordingly, it should be understood that the promoter 50 illustrated in FIG. 50 may be any of a number of entities in the retail, wholesale, and promotions industry and is not intended to be limited to any particular role. Nevertheless, the promoter 50 is the entity that determines to begin a promotional campaign. The promoter 50 determines to generate a promotion on products or services, and engages a promotions provider 52 to operate the promotion on its behalf. In a typical example of a promotion, a promotion campaign will involve generation of a number of coupons representing a discount on the goods or services of the manufacturer/service provider that is either the promoter 50 or is represented by the promoter 50.

Historically and even often today, promotions typically involved printing and distribution of a number of generic or identical coupons in newspapers, magazines, mailers, and the like. The provision of such coupons entitled the bearer thereof to receive a discount (a percentage or set amount off) at any retailers accepting coupons provided by the manufacturer (or issued by an issuer on behalf of the manufacturer). Typically, such coupons are valid for a limited period of time, after which they are no longer accepted at retailers or other locations. The provision of generic or identical paper coupons in this manner leads to certain problems for the parties involved in the promotional offer and redemption process. Often, it can be difficult to estimate a rate at which the promotional offers will be redeemed. Additionally, paper coupons are subject to duplication attempts whereby more coupons may enter the stream of commerce than the promoter 50 originally intended. Accordingly, promoters 50 cannot predict the frequency at which coupons will be redeemed, or do anything to stop a promotion that results in greater redemption than expected, whether due to fraudulent causes or to other innocent causes. As a result, some promotions have resulted in promotion overspending.

Traditional coupons are typically entered into point-of-sale computer systems by the owners of the point of sale, either once near the start of a promotion, or on an ongoing basis as each coupon is received. Some traditional coupons are printed with bar codes or other redemption indicia that facilitates computer-based scanning or other automated entry by the point-of-sale systems, but traditional coupons are typically identical such that they all share an identical bar code or other scanning indicia. Again, such coupons are not at all fraud resistant, and furthermore they lack any mechanism that permits rapid verification of coupon authenticity and redemption in a way that would permit rapid reconciliation and settlement. Additionally, limiting use of the coupons to specific items actually purchased requires either that the retailer enters the coupon into its system and associates it with limited items for sale, or relies on checkout personnel to ensure that associated items were actually purchased.

Accordingly, the retailer is forced to accept a loss on sales until enough time has passed to allow for sending in received coupons, transport of such coupons to an offsite (often out-of-country to take advantage of reduced labor costs) location for verification and counting, auditing, and any other reconciliation processes before the retailer is ever reimbursed for applied discounts. Additionally, if the coupon is entered incorrectly at the point-of-sale systems, it can result in coupons being redeemed for more or less than face value, again leading to problems for the retailer and/or the promoter 50.

Systems and methods in accordance with embodiments of the invention address these and similar concerns. In the representative environment illustrated in FIG. 3, the promoter 50 (which may, in some embodiments, be a manufacturer) enters into a relationship with a promotions provider 52. In at least some embodiments, there is an electronic communicative link established between the promoter 50 and the promotions provider 52, whereby a representative of the promoter 50 is able to access systems operated by the promotions provider 52 and associated with a promotional campaign so as to review associated reports and/or to manage one or more aspects of the promotional campaign. The representative of the promoter 50 may be any person or group of persons tasked with managing the promotion on behalf of the promoter 50. In other embodiments, an electronic communications link is not established between the promoter 50 and the promotions provider 52. In some other embodiments, the promoter 50 and the promotions provider 52 are the same business entity or are divisions within a single business entity.

In the embodiment illustrated in FIG. 3, the promotions provider 52 is tasked with operating or directly managing a promotional campaign on behalf of the promoter 52. The promoter 50 and the promotions provider 52 initially establish the baseline operating conditions for the promotion. By way of example, the initial step may include defining that the promoter 52 wishes to offer a promotional campaign that will result in a total promotions redemption spend of $500,000 (or whatever desired amount), with that redemption spend being allocated to $5 coupons. Accordingly, the anticipated promotional campaign has a target of 100,000 redeemed coupons. In some embodiments, either or both of the promoter 50 or the promotions provider 52 has information from past promotional campaigns that will dictate an approximate number of coupons or other promotional offers that will have to be issued for the promotion to reach the anticipated/desired level of redemption.

To fund the promotional campaign, the promoter 50 transfers an appropriate amount of money (e.g., the $500,000 plus any fees charged by the promotions provider 52) to the promotions provider 52. At that time, the promotions provider 52 internally serializes an appropriate number of coupons or promotional offers (if in a form other than a coupon), whereby each coupon or promotional offer receives its own serial number. Because each coupon or promotional offer is individually serialized, its issuance and redemption can be tracked for a variety of purposes, including permitting rapid reconciliation and settlement as well as tracking use for purchase of allowed items (e.g., filtered to be SKU or other identifier specific).

Accordingly, the promotions provider 52 in some embodiments adds information about the coupons or promotional offers and their serial numbers to a blockchain. Accordingly, because the coupons or promotional offers are recorded on the blockchain, they are resistant to tampering and can be readily tracked. As coupons and promotional offers are issued (offered to consumers) and then redeemed, their accompanying records on the blockchain are updated in some embodiments such that a comprehensive record of the coupons or offers is maintained. In some embodiments, redemption attempts can be checked against the blockchain before authorizing redemption to prevent fraudulent double redemption attempts, coupon/offer copying, and the like.

In some embodiments, the serial numbers assigned to the individual coupons or promotional offers are only used internally to the promotions provider 52. The serial numbers operate as an internal tracking mechanism used by the promotions provider in processes such as tracking offers issued and redeemed, and in generating reports. Such reports may include internal reports as well as reports issued to the promoter 50.

In some embodiments, the promotions provider 52 communicates with a bank card processor 54 to facilitate transactions with the coupons or other promotional offers. The bank card processor 54 may be any of a variety of current or future existing payment processors capable of authorizing and processing payments on bank cards (e.g., credit cards). By way of example, the bank card processor 54 may be an entity such as Mastercard Incorporated, capable of processing MasterCard-branded bank cards. Of course, the bank card processor 54 may be any desirable bank card processor or payment processor. In some embodiments, the promotions provider 52 and the bank card processor 54 are the same business entity or are divisions within a single business entity.

In some embodiments, as illustrated in FIG. 3, the promotions provider 52 also communicates with a consumer computing device 56 that is operated by a consumer. Accordingly, an at least intermittent communicative connection is established between one or more computing devices of the promotions provider 52 and the consumer computing device 56. Such communicative connection may be established using existing network infrastructure, including wired and wireless connections, and including use of portions of the Internet, for example. The consumer computing device 56 may be any of a variety of devices in accordance with varying embodiments of the invention. By way of example, the consumer computing device 56 may be a smart phone, a tablet computer, a laptop computer, a desktop computer, a special-purpose computing device such as an application-specific device, and the like.

In some embodiments, a coupon or promotional offer is issued and distributed using traditional means, such as in newpapers, by mail, or by other distribution mechanisms. In such embodiments, however, the coupon or promotional offer is distributed in each individual instance as or with a unique gift card number for each coupon or offer, to ensure that the coupon or offer is resistant to duplication or other fraudulent activity.

In some embodiments, the promotions provider 52, in running the promotion, makes a determination to issue a coupon or promotional offer to the consumer through the consumer computing device 56. This determination may be made in a variety of manners and taking into account a variety of factors. By way of one example, the promotions provider 52 may determine to issue a coupon or promotional offer to the consumer through the consumer computing device 56 based on a geographic location of the consumer computing device 56 (e.g., as determined via a GPS determination or by passage through a geofence as determined by GPS or RFID data). As a specific example of this, a coupon or promotional offer relating to offerings by a local convenience store (e.g., a gasoline promotion, a promotion on fountain drinks, a promotion on snacks, or the like) may be triggered upon passage of the consumer computing device 56 (in this case a mobile device like a smart phone) into a geofenced area surrounding a branch of the convenience store.

As another example of manners and factors in determining to issue a coupon or promotional offer, the consumer may use the consumer computing device to indicate an interest in promotional offers in general or in promotional offers of a particular type. In some embodiments, the consumer uses a program such as a smartphone app or a website that is dedicated to coupons and promotional offers. In other embodiments, the consumer uses a program such as a smartphone app or a website that is dedicated to providing a particular type of service (e.g., a gasoline price/purchase app or website, a supermarket app or website, etc.). Regardless of the app, program, or website used, when the consumer indicates interest in coupons or other promotional offers, the promotions provider 52 makes a determination as to whether the consumer is eligible for any applicable coupons or promotional offers.

When the promotions provider 52 determines that the consumer is eligible to receive a coupon or promotional offer, the system does not necessarily immediately issue the coupon or promotional offer. Instead, in some embodiments, the promotions provider systems initially present information about the promotional offer to the consumer computing device 56, whereby the consumer is enabled to evaluate the promotional offer and determine whether or not the promotional offer is one the consumer wishes to take advantage of. If so, the consumer can so indicate by way of an action, such as an interaction with a program, app, or website, as is known in the art. In other embodiments, such as when the consumer has already expressed an interest in promotional offers or coupons, the promotions provider 52 may immediately proceed to issuing a coupon or formal promotional offer.

At the point where the promotions provider 52 determines to issue a coupon or promotional offer, one of the serialized promotional offers or coupons is allocated to the promotional offer, and a one-time-use bank card number (e.g., a gift card number, in some embodiments) is assigned to the promotional offer or coupon. For example, where the bank card number is a MasterCard number, the bank card number assigned to the promotional offer or coupon may be a sixteen-digit number. The bank card number acts as a redeemable code for redemption of the offer or coupon. Where information about coupons and/or offers is maintained on a blockchain, the bank card number associated with the offer/coupon is recorded to the blockchain, potentially along with information associated with the consumer to whom the offer/coupon is to be issued, along with information indicating that the offer/coupon was issued to the consumer. The offer or coupon is then issued to the consumer using the consumer computing device 56. No other consumer receives the same bank card number.

In embodiments where the coupon or promotional offer is to be limited to use with one or more specific products or services, the bank card number associated with the offer/coupon is also associated with one or more products or services for which redemption of the offer/coupon is authorized, and that authorization is also recorded. In some embodiments, the authorized product(s) or service(s) is/are recorded on the blockchain, and in other embodiments, the authorized product(s) or service(s) is/are recorded separately from the blockchain. In some embodiments, the information regarding the authorized products or services includes information associated with each item for which use of the gift card number and its associated gift card amount is authorized such as a SKU, a GTIN, a UPC, an ARN, or an APN.

The consumer may receive and use the coupon or offer in a variety of different ways. In some embodiments, the consumer receives a printable coupon, and may use a printing device (not shown in FIG. 3) to print the coupon for use at a point of sale. The printable coupon includes the bank card number and/or scannable indicia representative of the bank card number to facilitate redemption of the coupon at the point of sale. In other embodiments, the consumer receives an electronic coupon that the consumer is able to redeem at the point of sale by, for example, displaying the electronic coupon on his or her smartphone (e.g., the consumer computing device 56) either for scanning or manual entry of the bank card number at a point-of-sale device. Accordingly, FIG. 3 illustrates that the system of some embodiments includes a point-of-sale device 58 or system that is adapted to receive entry of the bank card number, either from the point-of-sale operator or from the consumer, such as using computing device 56. In some embodiments, the consumer computing device 56 and the point-of-sale device 58 are able to communicate with each other, such as wirelessly (e.g. near-field communication (NFC)). In other embodiments, the consumer receives the bank card number and is able to store it on a consumer magnetic strip adapted to be read by traditional magnetic strip readers at the point-of-sale device 58. In other embodiments, the consumer receives the bank card number as a gift card that is compatible with the EMV-standard chip-and-pin systems and is able to use it with an EMV-standard reader.

When the point-of-sale device 58 receives the bank card number, the point-of-sale device 58 initiates an authorization process with the bank card processor 54. Accordingly, the point-of-sale device 58 is in at least transient or intermittent communicative connection with the bank card processor 54. The bank card processor 54 performs an authorization step to verify that the bank card number is valid and unused, which step may be performed in part by communications with the promotions provider 52 in at least some embodiments. Accordingly, the promotions provider 52 has a communicative connection with the bank card processor 54. The promotions provider 52 can then check the bank card number against its records to ensure that the bank card number is valid and has not been used, and can update its records, including the blockchain, to reflect that the coupon or other promotional offer associated with the bank card number has been used and cannot be used again. Assuming the coupon, gift card, or other promotional offer has not yet been used and is otherwise still valid (an applicable promotional period has not expired or passed the expiration date assigned to the bank card number), an authorization is transmitted back to the point-of-sale device 58 by the bank card processor 54.

Embodiments of the invention, however, provide for a further authorization step to ensure that a balance associated with the coupon, gift card, or other promotional offer is only applied to purchase of authorized items. This step occurs between the promotions provider 42 and the retailer, and, in some embodiments, specifically the point-of-sale device 58. Accordingly, the point-of-sale device 58 is in at least transient or intermittent communicative connection with the promotions provider 52 (e.g., with a promotions provider server connected to a communications network). Such communicative connection is provided in various ways according to various embodiments of the invention. In some embodiments, the communicative connection between the point-of-sale device 58 and the promotions provider 52 utilizes a same or similar network as the communicative connection between the point-of-sale device 58 and the bank card processor 54, and may use the same or a similar network interface 24. In other embodiments, the communicative connection between the point-of-sale device 58 and the promotions provider 52 utilizes a different network than the communicative connection between the point-of-sale device 58 and the bank card processor 54, and may use a different network interface 24.

In some embodiments, the communicative connection between the point-of-sale device 58 and the promotions provider 52 is continuous or near-continuous and is used as necessary. In other embodiments, the communicative connection between the point-of-sale device 58 and the promotions provider 52 is intermittent and only established as necessary. In some embodiments, the communicative connection between the point-of-sale device 58 and the promotions provider 52 is a virtual connection, in that the retailer of the point-of-sale device establishes a communicative connection with the promotions provider 52 and obtains its own list of promotions (e.g., gift card numbers or the like) and associated allowable items, after which the point-of-sale system 58 connects to and/or references the previously obtained list maintained by the retailer on its own systems.

In some embodiments, the communicative connection between the point-of-sale device 58 and the promotions provider 52 is established by the point-of-sale device 58. In other embodiments, the communicative connection between the point-of-sale device 58 and the promotions provider 52 is established by a system of the promotions provider 52. Where the communicative connection is established by a system of the promotions provider 52, the promotions provider system obtains information regarding the identity of the point-of-sale device 58 from the bank card processor 54 as part of the authorization process for authorizing the bank card number, and the promotions provider system uses this information to establish communication with the point-of-sale device as part of the secondary authorization step (e.g., by way of an application programming interface (API) call to a system of the point-of-sale device 58). Where the point-of-sale device 58 establishes the communicative connection with the promotions provider system, it may do so based on information already stored by the point-of-sale system 58 or by systems of the retailer that identify when to establish the communicative connection.

Once the communicative connection between the promotions provider 52 and the point-of-sale system 58 is established, the secondary authorization step is performed. In this step, a comparison is performed between the redeemed bank card number (e.g., gift card number), and the information associated with allowed items (e.g., SKU number and the like). In some embodiments, the comparison is performed at the promotions provider 52. In such instances, the point-of-sale device 58 transmits a set of information identifying the one or more items purchased by the consumer to the promotions provider 52 (e.g., SKUs, GTINs, UPCs, ARNs, APNs, or the like). The systems of the promotions provider 52 then compare the purchased items to the items associated with the particular bank card number (e.g., gift card number) attempted to be redeemed as at least partial payment for that particular purchase to see if there is a match. If and only if there is a match, the promotions provider 52 then sends an authorization back to the point-of-sale device 58, whereby application of the balance to the purchase is authorized.

In other embodiments, the comparison is performed at the point-of-sale system 58 (or at another computer system controlled by the retailer). In such embodiments, the promotions provider system uses the bank card number to obtain from its memory stores the associated item or items for which use of the bank card number (e.g., gift card number) is authorized, and then transmits a set of information identifying the one or more authorized items (e.g., SKUs, GTINs, UPCs, ARNs, APNs, or the like) to the point-of-sale system 58. The point-of-sale system 58 then performs a comparison between this information and corresponding information relating to the purchased items stored in its memory stores to determine if a match exists. If and only if there is a match, the point-of-sale device 58 then applies the balance to the purchase. In some embodiments, a notification of application of the gift card balance is then transmitted back to the promotions provider 52, either directly by the point-of-sale device 58 or indirectly by way of a transmission to the bank card processor 54.

Accordingly, per methods such as these, real-time controls can be exerted on the redemption of gift cards and other promotional offers to ensure that promotional offers are item-specific, product-specific, service-specific and the like. Where an issued promotional offer (e.g., associated with a bank card number or gift card number) is attempted to be redeemed for products or services not associated with the offer, the attempt can be declined even if there is a balance remaining associated with the offer. Such declining happens in real time and prevents use of promotional balances for items such as products or services for which the offer was not intended.

Funds associated with redemption of the coupon or other promotional offer can then be allocated as necessary on an ongoing basis. In some embodiments, settlement of necessary funds can occur each day at the end of the day. In other embodiments, settlement of funds occurs less frequently, such as every three to five days or weekly. In other embodiments, settlement of funds can occur in real time. In general, settlement of funds may occur on a time schedule that greatly increases the rapidity with which retailers receive their money, taking into account factors such as money transfer costs associated with many small transfers (e.g., some accumulation may occur to minimize transfer fees). Thus, as may be appreciated, settlement of funds may occur on any desired schedule, taking into account ensuring relatively rapid settlement of funds while avoiding unnecessary transfers of small amounts of money repeatedly. In other words, in some embodiments, settlement of funds may occur no later than the earlier of after a certain amount of time has passed or after a minimum settlement amount is owed to a particular retailer or other person or entity associated with redemption of the coupon or other promotional offer.

In some embodiments, settlement occurs with payment to the retailer or other business or individual at which the coupon or other promotional offer was redeemed. In other embodiments, settlement occurs with payment to an account of the consumer that redeemed the coupon or other promotional offer. Each of these involves a slightly different mechanism or process associated with the bank card number of the coupon.

In some embodiments, when the bank card number is issued to the consumer, a fund amount associated with the coupon or promotional offer is associated with the bank card number. In effect, the consumer receives a bank card (equivalent to a gift card) with a monetary value equal to the coupon or promotional offer value (e.g., three dollars, ten euros, etc.). In such embodiments, the bank card number can be used like any traditional credit or gift card as partial payment for the goods or services associated with the promotional offer or coupon, except that unlike previous credit or gift cards, use of the card is limited to authorized purchases. In such embodiments, accordingly, the retailer receives the bank card number at the point-of-sale device 58, and an authorization request is sent to the bank card processor 54 in the amount of the face value of the coupon or other promotional offer. When the authorization is approved through both parts of the authorization process (both the card number through the bank card processor 54 and the item(s) purchased through the promotions provider 52), the discount is reflected in the total bill to the consumer at the point-of-sale device 58, and the remaining balance can be paid by the consumer using traditional methods. In this case, funds for the amount of the discount are transferred to the retailer associated with the point of sale.

In other embodiments, when the bank card number is issued to the consumer, no funds are directly associated with the coupon or promotional offer. When the bank card number is received at the point-of-sale device 58, the new authorization transaction with the bank card processor 54 is a zero-value authorization transaction, a zero-ping code, or the like. As this authorization is not a traditional authorization requiring the transfer of actual money to the retailer with guarantees by the bank card processor 54, the bank card processor 54 may optionally charge less for processing this authorization transaction, thereby reducing the cost of processing for the promotional campaign. The promotions provider 52 is still notified of the transaction and is still able to determine whether the transaction relates to an issued and unused coupon or other promotional offer, and can still record the transaction (e.g., on the blockchain), but no money is transferred to the retailer. Instead, at most, an "authorized" transmission is returned to the point-of-sale device 58, and the consumer still pays full price at the point of sale. Nevertheless, because a second authorization process occurs, the system is still able to verify and ensure that the promotional offer was used for its intended purpose. Then, when it comes time to settle the coupon or promotional offer value, the value is returned directly to the consumer, typically by crediting a consumer account associated with the consumer and/or an app operating on the consumer computing device 56.

An advantage of either process is that the retailer need not manually or otherwise program coupons and promotional offers into its systems. Instead, if the bank card is associated with a value, redemption of the card can occur by way of a traditional card authorization with the secondary item-specific authorization step, with the bank card processor 54 returning an authorization communication that includes the amount of the partial payment received from the bank card.

Similarly, if the bank card is not associated with a value, redemption of the card occurs by way of a zero-value authorization, with the secondary item-specific authorization step and the consumer still pays full value at the point of sale. The consumer then is reimbursed or receives associated funds directly without merchant involvement. Accordingly, the burden on retailers and other merchants accepting coupons and promotional offers is greatly reduced for both the settlement process as well as the process of being able to accept coupons and promotional offers.

Figure 4:
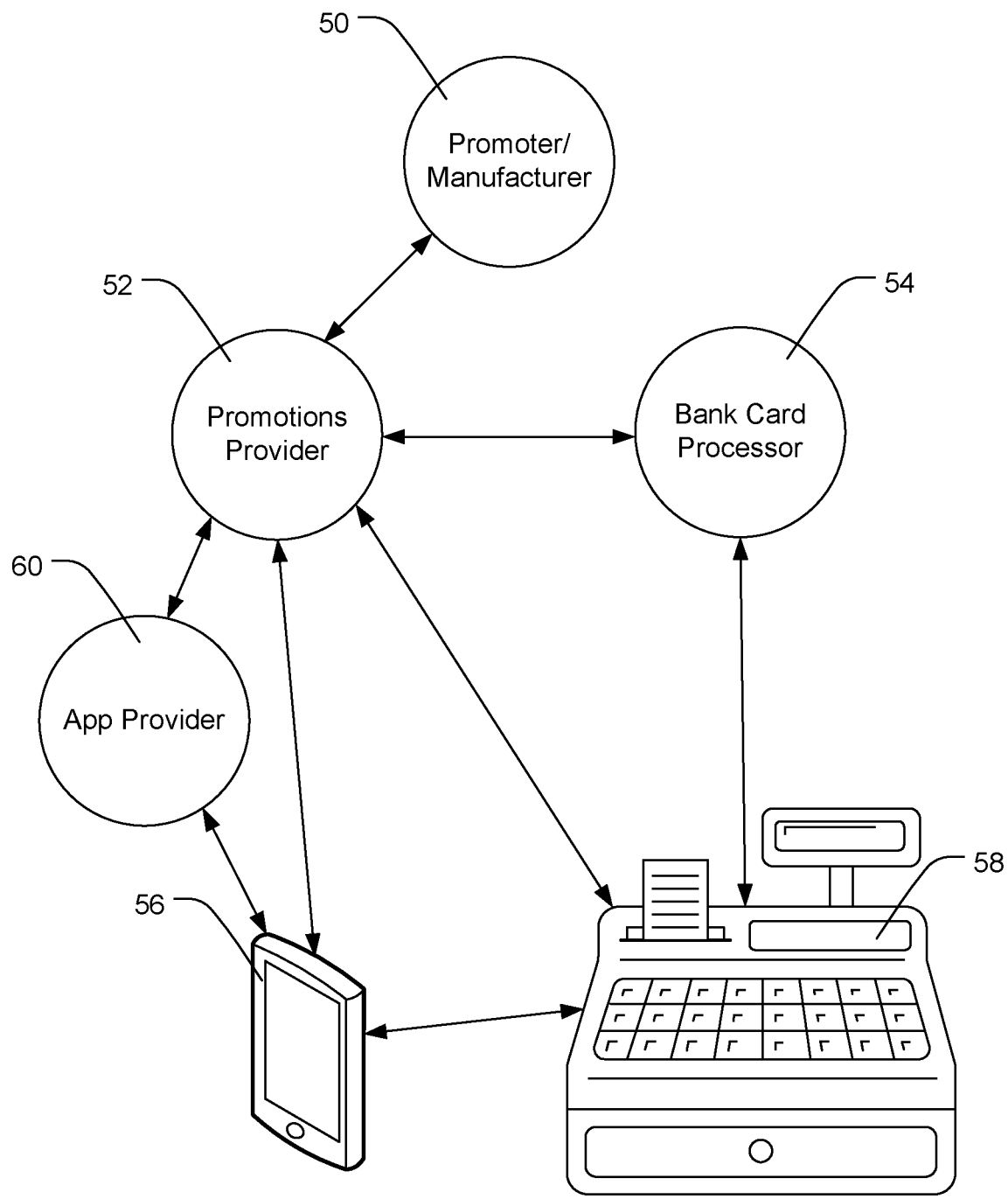
FIG. 4 shows another example of a representative environment in which embodiments of the invention may be implemented.

An example of a zero-value authorization environment is illustrated with respect to FIG. 4. This environment is largely similar to the environment of FIG. 3, with the addition of an app provider 60 that provides an app to the consumer computing device 56. In some embodiments, the app provider 60 and the promoter 50 are the same business entity or are divisions of the same business entity. In some embodiments, the app provider 60 and the promotions provider 52 are the same business entity or are divisions of the same business entity. The app provider 60 provides an app that operates on the consumer computing device 56. The app provider 60 may also deliver services to the consumer through the app operating on the consumer computing device 56. By way of example, an app operating on the consumer computing device 56 may provide gas price information to the consumer to facilitate comparison shopping, and may receive and the app provider 60 may deliver updated price information through the app. The consumer may own a consumer account associated with the app, whereby the consumer may receive additional services, discounts, and the like using the app, and may even be able to pay others for goods or services through the app.

In some embodiments, the coupon or other promotional offer is first presented to the consumer through the app provided by the app provider 60. The consumer is also able to accept the offer and receive the coupon or other promotional offer through the app. The consumer may also be able to present the coupon or other promotional offer at the point of sale using the app.

In this environment, when the bank card number is not associated with a value whereby the consumer can partially pay at the point of sale with the bank card number, the system can still provide an equivalent value to the consumer. When the consumer redeems the coupon or other promotional offer at the point-of-sale device 58, the zero-value authorization transaction occurs, and the secondary item-specific authorization occurs, in some embodiments the promotions provider 52 notifies the app provider 60 of the transaction and transfers appropriate funds to the app provider 60. The app provider then credits an account of the consumer on the app with an amount equal to the coupon or other promotional offer. The consumer can then use the funds for goods or services through the app or using the app at other points of sale, if the app provides such functionality. In other embodiments, the app may allow the user to transfer funds from the app to the user's bank account or to other app users.

All this functionality is provided without requiring a direct funds authorization through the bank card processor 54. Instead, because the promotions provider 52 is aware that the coupon or other promotional offer was associated with the bank card number and was issued to the consumer (e.g., upon request of the consumer or upon satisfaction of a geo-location requirement or other precondition), when the promotions provider 52 receives notification of the zero-value authorization request, the promotions provider 52 knows the coupon or other promotional offer was used and can initiate the secondary item-specific authorization process and can then undertake settlement of the value of the offer through any desired process, including nontraditional mechanisms. This settlement process may be immediate or on any appropriate time schedule (e.g., daily, every few days, weekly, etc., as discussed previously).

Figure 5:
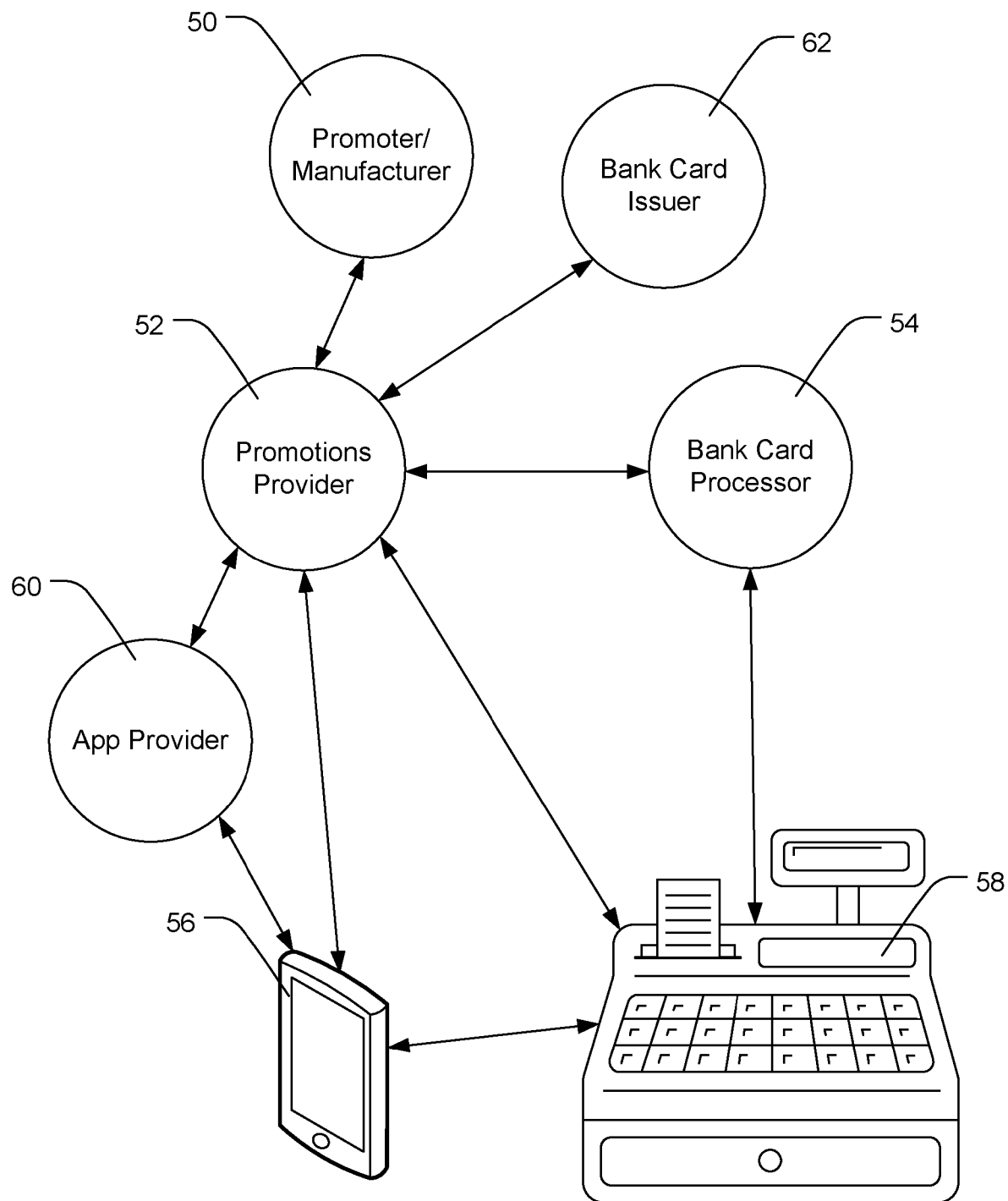
FIG. 5 shows another example of a representative environment in which embodiments of the invention may be implemented.

As may be appreciated, embodiments of the invention utilize bank card numbers for each coupon or other promotional offer. Accordingly, as illustrated in FIG. 5, certain embodiments of the invention are implemented in a system in which a bank card issuer 62 issues a number of bank card numbers for use in the promotional campaign. As may be appreciated, the obtaining of bank card numbers represents a cost to the promotional campaign. Additionally, the authorization fees charged by the bank card processor 54, whether as zero-value authorizations or authorizations of the face value of the coupon or other promotional offer, are also a cost of the promotional campaign. Accordingly, the promotions provider 52 typically passes such costs on to the promoter 50 when the promotional campaign is initiated. In some instances, lower per-coupon costs may be obtained by way of bulk purchases of bank card numbers and/or by negotiating bulk authorization rates with the bank card processor 54.

Because the use of legitimate bank card numbers in the process represents a cost to the promotional campaign, bank card numbers are typically only associated with coupons or other promotional offers at the time of issuance of a specific coupon or other promotional offer. In embodiments where the coupon or other promotional offer is associated with locational proximity to the location where the coupon or other promotional offer will be used, there is a high likelihood that the coupon or other promotional offer will be redeemed. Nevertheless, a certain amount of non-redeemed offers is to be expected, again representing a cost of the promotional campaign. Nevertheless, embodiments of the invention represent a significant improvement over current coupon promotional campaigns where often a vast number of coupons go unused.

Embodiments of the invention also represent a significant improvement in promoters', issuers', and manufacturers' abilities to monitor and control their promotional campaigns. The secondary item-specific authorization process, in particular, represents a significant improvement in promoters', issuers', and manufacturers' abilities to monitor and control their promotional campaigns. Because coupons and promotional offers can be offered directly to interested consumers and consumers that are in geographic proximity to locations of use, the redemption rate for coupons and other promotional offers is relatively high. Accordingly, fewer overall coupons and promotional offers need be issued, and issuance of coupons and promotional offers can stop at any time, thereby limiting outflow of money relative to the promotional campaign. The promoter 50, issuer, and/or manufacturer will not find itself in a position of underestimating the appeal and/or redemption rate of coupons or promotional offers, such that promoters 50 need not be concerned that promotional campaigns will greatly exceed their allocated budgets.

The promotions provider 52 is also able to provide various reports to the promoter 50 to keep the promoter 50 informed of the status of the promotional campaign. Reports may be provided on a scheduled basis, or the promoter 50 is in some embodiments enabled to access reports on demand to view real-time status of the promotional campaign. The promoter 50 and the promotions provider 52 are thus informed and able to take action if necessary to discontinue or modify the promotional campaign.

Because of the tools and real-time control provided to the promoter 50 by embodiments of the invention, the promoter 50 is able to exercise control over the promotional campaign in ways so as to better achieve campaign goals. By way of example, the promoter 50 may wish, and may have arranged with the promotions provider 52, a promotional campaign that will result in a certain number of promotional redemptions in a certain amount of time. As a specific example, the promoter 50 may intend for a promotion to run for two weeks and may allocate $1 million dollars initially intended to be distributed as 200,000 $5 dollar promotional offers. As the promotional campaign progresses, the promoter 50 may access reports provided by the promotions provider 52 at any time, and may determine that either fewer or more promotional offers are being accepted and redeemed than expected.

If fewer promotional offers are being accepted and redeemed than expected, the promoter 50, possibly consulting with the promotions provider 52, may determine to modify the manner in which the promotions are being offered to consumers or may elect to make the terms of the promotional offer more enticing. As a specific example, if a week of the two-week promotional period has passed and only 10,000 (of the 200,000 anticipated) promotional offers have been accepted, let alone redeemed, the promoter 50 may elect to increase the rate at which or manners by which promotional offers are displayed to consumers for acceptance. Alternately or additionally, the promoter 50 may elect to increase the number of products to which the promotional offer applies. Still alternatively or additionally, the promoter 50 may elect to increase the value of the promotional offer to $6 dollars or some other increased value over the original $5 dollar offering. Any appropriate action may be taken to modify the promotional campaign to achieve campaign goals.

Similarly, if more promotional offers are being accepted and redeemed than initially expected, the promoter 50 may elect to take an action to modify the promotional campaign appropriately. As one example, the promoter 50 may elect to dedicate more funds to the promotional campaign to permit more promotional offers to be extended. Alternatively, the promoter 50 may elect to modify future offered promotions to apply to fewer goods or services, or may even reduce the value of yet-unaccepted or yet-offered promotions to make promotional campaign funds last longer. Such actions can be taken at any time in real time, and can be applied to all offered promotions moving forward.

In some limited circumstances (typically to the benefit of consumers), changes to promotional offers may be made even after acceptance by the consumer but before redemption. For example, a promotion accepted by the consumer may be increased in value after acceptance to encourage redemption. In some embodiments, for example where the promotional offer is provided through an app on the consumer computing device 56, the consumer may be reminded of accepted, but unredeemed, offers from time to time, such as upon a return of the consumer to a local where the promotional offer may be redeemed. Such reminder may include a notification that a value of the promotional offer has increased if such has occurred.

Reminders of accepted promotional offers may serve as another control by which the promoter 50 or promotions provider 52 may seek to modify a redemption rate associated with the promotional campaign. If, for example, an initial reminder rate fails to result in an anticipated or desired level of redemption of promotional offers, the promotions provider 52 may provide an opportunity for the promoter 50 to elect to increase the number of reminders provided to consumers who accepted the promotion. Accordingly, embodiments of the invention provide significant advantages to promoters 50 and to promotional campaigns in the manner in which campaigns can be controlled in real time.

Embodiments of the invention greatly protect against fraudulent activity, essentially eliminating the opportunity for fraud. Additionally, embodiments of the invention greatly improve the settlement process, whereby the recipients of coupons on redemption no longer need participate in a time-consuming manual or pseudo-manual process to receive reimbursement for received coupons. Instead, the prior months-long settlement process is reduced to as little as a day or a few days. In some embodiments, settlement can occur at the time of each transaction (e.g., in real time), essentially eliminating all settlement delay. Because fraud is eliminated using embodiments of the invention, settlement occurs at full coupon value, greatly benefiting honest retailers who often received only 80% or less of coupon value using traditional methods.

The promotions provider 52 maintains a full transaction log of all transactions from creation of the promotional campaign through settlement, including serialization of the coupons or other promotional offers, assigning of the bank card numbers on issuance of the coupons or other promotional offers, redemption thereof, and settlement for redeemed offers. In some embodiments, this information is maintained on the blockchain to prevent data tampering. Accordingly, the promotions provider 52 and the promoter 50 are able to fully able to audit the promotional campaign and verify return on investment at any point in the process, representing a significant improvement over prior methods.

Additionally, methods in accordance with embodiments of the invention provide significantly more information to promoters 50 about the effectiveness of their promotional campaigns. Embodiments of the invention allow the promotions provider 52 to track far more information than merely the number of redeemed offers at the end of a promotional campaign. Instead, the promotions provider 52 can track the rate at which offers are accepted by consumers compared to the rate offers were shown to consumers. The promotions provider 52 can also track the rate at which offers are redeemed as opposed to the rate at which offers were accepted by consumers. The promotions provider 52 can also track down to item-specific redemptions, including where promotional offers applied to more than one item. Furthermore, more granular data can be obtained, such as by way of comparison of offer acceptance and redemption rates in certain locations, with certain timing, and the like. Promoters 50, issuers, and manufacturers can accordingly be much better informed as to the effectiveness of their promotional campaigns.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A method for facilitating real-time item-specific application of a gift card balance to a purchase within a collaborative gift card network, the collaborative gift card network comprising:
    a network-connected server, the server comprising:
        one or more communications modules configured to establish one or more communicative connections with external computer systems over one or more computer networks;
        a long-term memory store;
        a blockchain record maintained on the long-term memory store;
        short-term memory; and
        a processor;
        wherein the communications module, the long-term memory store, and the short term memory store are operatively connected with the processor to allow the processor to access the communications module, the long-term memory store, and the short-term memory thereby providing the processor with access to data therefrom and transfer of data thereto;
    a retailer computer system;
    a consumer computing device; and
    a bank card processor computer system;
the method comprising:
    storing, in the blockchain record of the long-term memory store, information relating to one or more items for which use of a one-time-use gift card is authorized, the information relating to one or more items for which use of a one-time-use gift card is authorized comprising information selected from the group consisting of a stock keeping unit (SKU), a global trade item number (GTIN), a universal product code (UPC), an international article number (ARN), and an Australian product number (APN) or the one or more items for which use of a one-time-use gift card is authorized;
    generating a list of one-time-use gift card numbers and associated gift card amounts;
    storing the one-time-use gift card numbers and associated gift card amounts in the blockchain record of the long-term memory store with an association between each one-time-use gift card number and its associated gift card amount and information identifying one or more items for which use of the one-time-use gift card number and its associated gift card amount is authorized;
    establishing a bank card processor communicative connection between the server and bank card processor computer system;
    establishing a retailer communicative connection between the server and the retailer computer system;
    forming a geofence to create a geofenced area;
    determining passage of the consumer computing device into the geofenced area, as determined by at least one of GPS data and RFID data obtained from the consumer computing device;
    upon passage of the consumer computing device into the geofenced area, as determined by at least one of GPS data and RFID data obtained from the consumer computing device, issuing one of the one-time-use gift card numbers to a consumer through the consumer computing device for use in purchasing the one or more items for which of use of the one-time-use gift card number is authorized;
    receiving the one-time-use gift card number at the retailer computer system as at least partial payment for a purchase;

receiving an authorization request at the bank card processor computer system from the retailer computer system over a bank card authorization communicative connection;

receiving at the server, over the bank card processor communicative connection from the bank card processor computer system, an electronic communication comprising the one of the one-time-use gift card numbers and information identifying a retailer where the one of the one-time-use gift card numbers was provided as at least partial payment for a purchase;

updating the blockchain record with information related to the purchase when the purchase includes the one or more items for which use of the one-time-use gift card number and its associated gift card amount is authorized; and automatically transmitting from the server, over the retailer communicative connection to the retailer computer system, information authorizing the retailer where the one-time-use gift card number was provided as at least partial payment to apply the gift card amount to the purchase only when the purchase includes the one or more items for which use of the one-time-use gift card number and its associated gift card amount is authorized.

2. The method as recited in claim 1, further comprising receiving at the network-connected server, over the retailer communicative connection from the retailer computer system, an electronic communication including information identifying one or more items included in the purchase.

3. The method as recited in claim 2, further comprising: associating the electronic communication received over the bank card processor communicative connection with the electronic communication received over the retailer communicative connection;

retrieving, from the long-term memory store information the information identifying one or more items for which use of the one-time-use gift card number and its associated gift card amount is authorized;

using the processor to identify a match between the information identifying one or more items for which use of the one-time-use gift card number and its associated gift card amount is authorized and the information identifying one or more items included in the purchase; and generating the information authorizing the retailer to apply the gift card amount to the purchase.

4. The method as recited in claim 2, wherein the information identifying one or more items included in the purchase comprises information selected from the group consisting of a stock keeping unit (SKU), a global trade item number (GTIN), a universal product code (UPC), an international article number (ARN), and an Australian product number (APN).

5. The method as recited in claim 2, further comprising transmitting, over the retailer communicative connection, a request to the retailer computer system to provide the information identifying the one or more items included in the purchase.

6. The method as recited in claim 5, wherein the server selects the retailer computer system based on the information identifying a retailer received over the bank card processor communicative connection.

7. The method as recited in claim 1, further comprising: using the one-time-use gift card number and the information identifying a retailer received over the bank card processor communicative connection to retrieve the association between the one-time-use gift card number and the information identifying one or more items for which use of the one-time-use gift card number and its associated gift card amount is authorized; and generating the information authorizing the retailer where the one-time-use gift card number was provided as at least partial payment to apply the gift card amount to the purchase only if the purchase includes one or more items matching the one or more items for which use of the one- time-use gift card number and its associated gift card amount is authorized.

8. The method as recited in claim 7, wherein the information authorizing the retailer where the one-time-use gift card number was provided as at least partial payment to apply the gift card amount to the purchase comprises information associated with each item for which use of the one-time-use gift card number and its associated gift card amount is authorized selected from the group consisting of a stock keeping unit (SKU), a global trade item number (GTIN), a universal product code (UPC), an international article number (ARN), and an Australian product number (APN).

9. The method as recited in claim 1, wherein the information identifying a retailer where the one-time-use gift card number was provided as at least partial payment includes information identifying a point-of-sale (POS) system at which the one-time-use gift card number was provided.

10. A system for facilitating real-time item-specific application of a gift card balance to a purchase at a retailer point of sale within a collaborative gift card network, comprising: a network-connected server and computer systems of a retailer and a bank card processor, the system comprising:

a network-connected server, the server comprising:
    one or more communications modules configured to establish one or more communicative connections with external computer systems over one or more computer networks;
    a long-term memory store;
    a blockchain record maintained on the long-term memory store;
    short-term memory;
    a processor;
    wherein the communications module, the long-term memory store, and the short term memory store are operatively connected with the processor to allow the processor to access the communications module, the long-term memory store, and the short-term memory thereby providing the processor with access to data therefrom and transfer of data thereto;

a retailer computer system;
a consumer computing device; and
a bank card processor computer system;
    wherein the blockchain record of the long-term memory stores:
        information relating to one or more items for which use of a one-time-use gift card is authorized, the information relating to one or more items for which use of a one-time-use gift card is authorized comprising information selected from the group consisting of a stock keeping unit (SKU), a global trade item number (GTIN), a universal product code (UPC), an international article number (ARN), and an Australian product number (APN) or the one or more items for which use of a one-time-use gift card is authorized; and a list of one-time-use gift card numbers and associated gift card amounts with an association between each one-time-use gift card number and its associated gift card amount and information identifying one or more items for which use of the one-time-use gift card number and its associated gift card amount is authorized;

a bank card processor communicative connection established between the server and the bank card processor computer system;

a retailer communicative connection established between the server and the retailer computer system; and wherein the server is configured to form a geofence to create a geofenced area;

wherein the server is configured to determine passage of the consumer computing device into the geofenced area, as determined by at least one of GPS data and RFID data obtained from the consumer computing device;

wherein the server is configured to issue one of the one-time-use gift card numbers to a consumer through the consumer computing device for use in purchasing the one or more items for which of use of the one-time-use gift card number is authorized when the consumer computing device is located within the geofenced area;

whereby the bank card processor computer system transmits to the server and the server is programmed to receive, over the bank card processor communicative connection from the bank card processor computer system, an electronic communication comprising the one of the one-time-use gift card numbers and information identifying a retailer where the one-time-use gift card number was provided as at least partial payment for a purchase when the bank card processor computer system receives the authorization request indicating the one of the one-time-use gift card numbers was used at a retailer as at least partial payment for a purchase;

whereby the blockchain updates the blockchain record with information related to the purchase when the purchase includes the one or more items for which use of the one-time-use gift card number and its associated gift card amount is authorized; and whereby the server is programmed to automatically transmit, over the retailer communicative connection to the retailer computer system, information authorizing the retailer where the one-time-use gift card number was provided as at least partial payment to apply the gift card amount to the purchase only when the purchase includes the one or more items for which use of the one-time-use gift card number and its associated gift card amount is authorized.

11. A system for facilitating item-specific application of a gift card balance to a purchase within a collaborative gift card network, the system comprising:

a geofence;

a point-of-sale (POS) system comprising:
 a processor;
 an item-entry system adapted to receive information identifying purchased items as parts of sales;
 a storage system comprising a computer memory operatively coupled to the item-entry system and configured to store the information identifying purchased items;
 a payment-receipt system adapted to receive information associated with a gift card payment for sales;
 a payment-redemption communicative connection adapted to be in at least intermittent communicative connection with a payment-authorization network; and
 a product-verification communicative connection adapted to be in at least intermittent communicative connection with a product-verification network;

a network-connected product-verification server, the server comprising:
 one or more communications modules configured to establish one or more communicative connections with the POS system over one or more computer networks;
 a long-term memory store;
 short-term memory; and
 a processor;

wherein the communications module, the long-term memory store, and the short term memory store are operatively connected with the processor to allow the processor to access the communications module, the long-term memory store, and the short-term memory thereby providing the processor with access to data therefrom and transfer of data thereto;

a blockchain record of the long-term memory store storing information relating to one or more items for which use of a one-time-use gift card is authorized, the information relating to one or more items for which use of a one-time-use gift card is authorized comprising information selected from the group consisting of a stock keeping unit (SKU), a global trade item number (GTIN), a universal product code (UPC), an international article number (ARN), and an Australian product number (APN) or the one or more items for which use of a one-time-use gift card is authorized;

the blockchain record of the long-term memory store storing a list of one-time-use gift card numbers and associated gift card amounts with an association between each one-time-use gift card number and its associated gift card amount and information identifying one or more items for which use of the one-time-use gift card number and its associated gift card amount is authorized;

wherein the server is configured to create a geofenced area from the geofence;

wherein the server is configured to determine passage of a consumer computing device into the geofenced area, as determined by at least one of GPS data and RFID data obtained from the consumer computing device;

wherein the server is configured to issue one of the one-time-use gift card numbers to a consumer through the consumer computing device for use in purchasing the one or more items for which of use of the one-time-use gift card number is authorized when the consumer computing device is located within the geofenced area;

wherein the POS system, upon receipt of a one-time-use gift card as at least partial payment for a purchase transaction, sends an authorization request via a bank card authorization connection to a bank card computer system to verify that the one-time-use gift card is valid and unused, whereby the bank card computer system transmits to the server and the server is programmed to receive, over the bank card authorization connection from the bank card computer system, an electronic communication comprising the one of the one-time-use gift card numbers and information identifying a retailer where the one-time-use gift card number was provided as at least partial payment for a purchase when the bank card computer system receives the authorization request indicating the one of the one-time-use gift card numbers was used at a retailer as at least partial payment for a purchase;

whereby the blockchain updates the blockchain record with information related to the purchase when the purchase includes the one or more items for which use of the one-time-use gift card number and its associated gift card amount is authorized; and whereby the server is programmed to automatically transmit, to the POS system. information authorizing the retailer where the one-time-use gift card number was provided as at least partial payment to apply the gift card amount to the purchase only when the purchase includes the one or more items for which use of the one-time-use gift card number and its associated gift card amount is authorized.

* * * * *